W. Badger,
Washing Machine.

No. 102,472. Patented May 3, 1870.

Witnesses:
L. S. Mabee
Alex. F. Roberts

Inventor:
Wm. Badger
per Munn & Co
Attorneys

United States Patent Office.

WILLIAM BADGER, OF HASTINGS-ON-HUDSON, NEW YORK.

Letters Patent No. 102,472, dated May 3, 1870.

IMPROVED WASHING-MACHINE.

The Schedule referred to in these Letters Patent and making part of the same.

*To all whom it may concern:*

Be it known that I, WILLIAM BADGER, of Hastings-on-Hudson, in the county of Westchester and State of New York, have invented a new and useful Improvement in Washing-Machine; and I do hereby declare that the following is a full, clear, and exact description thereof, which will enable others skilled in the art to make and use the same, reference being had to the accompanying drawing forming part of this specification.

This invention relates to improvements in washing-machines, and consists in a simple and inexpensive attachment to ordinary wash-tubs for converting them into washing-machines with oscillating beaters, the same being suspended on a cover arranged for detachable connection to the tub, by means of keys wedging into the holes of the handles, and clamping the cover down on the top of the tub.

Figure 1:
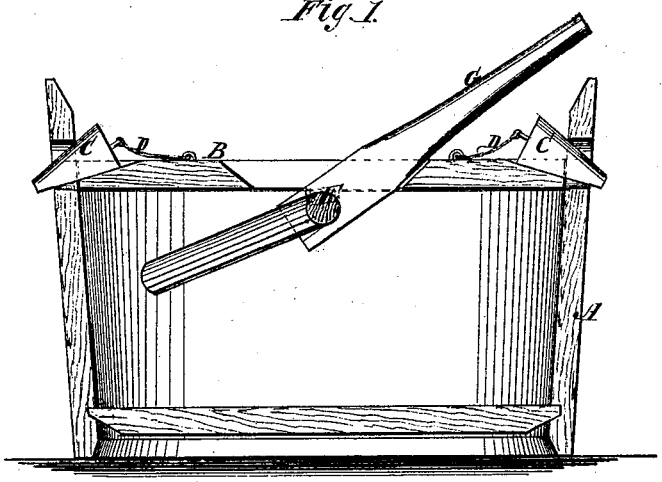
Figure 2:
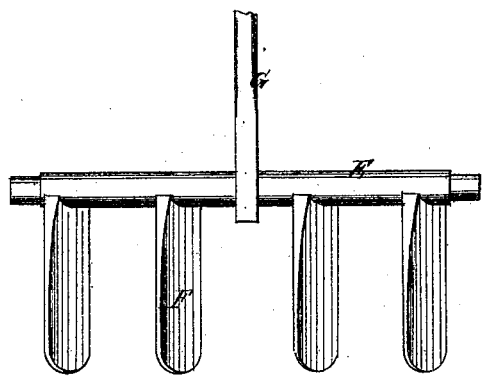

Figure 1 is a sectional elevation of a common wash-tub converted into a washing-machine by my improved attachment, and Figure 2 is a view of the beaters and their shaft detached from the cover.

Similar letters of reference indicate corresponding parts.

A is an ordinary wash-tub.

B, a cover, fitted to the top, with recesses in the edge corresponding to the handles of the tub.

C represents keys fitted for driving into the holes in the handles, from the inside and above the cover, for clamping it down and holding it temporarily.

The said keys are preferably connected to the cover by cords or chains D, for convenience in keeping them together.

E is an oscillating shaft fitted to the under side of the cover, and provided with arms or beaters F, for action on the clothes to be placed in the tub.

G is a handle arranged for passing through a notch in the top of the cover, and attaching to the shaft E for oscillating it, by moving the said handle back and forth.

The shaft, beaters, and handle may be made of metal, and galvanized, or otherwise prepared to resist the corroding action of the water, and the cover may be made of wood, or other suitable substance.

It will be seen that this simple attachment readily converts the ordinary wash-tub into an efficient washing-machine, by which the clothes may be washed more rapidly and easily than on the board, and that the said attachment being removed from the tub leaves it free for the uses of an ordinary wash-tub.

Having thus described my invention,

I claim as new and desire to secure by Letters Patent—

The combination, with a wash-tub, of a cover, B, having an oscillating shaft and agitating rotating arms attached, and arranged for operation by a hand-lever, G, the said cover being arranged for attachment to the tub by wedges C, substantially as specified.

The above specification of my invention signed by me this 24th day of February, 1870.

WILLIAM BADGER.

Witnesses:
GEO. W. MABEE,
ALEX. F. ROBERTS.